(12) United States Patent
Rashinkar

(10) Patent No.: US 12,522,169 B2
(45) Date of Patent: Jan. 13, 2026

(54) SAFETY MODULE FOR A VEHICLE

(71) Applicant: Faurecia India Private Limited, Pune (IN)

(72) Inventor: Prashant Rashinkar, Maharashtra (IN)

(73) Assignee: FAURECIA INDIA PRIVATE LIMITED, Pune (IN)

( * ) Notice: Subject to any disclaimer, the term of this patent is extended or adjusted under 35 U.S.C. 154(b) by 0 days.

(21) Appl. No.: 18/962,823

(22) Filed: Nov. 27, 2024

(65) Prior Publication Data

US 2025/0170980 A1    May 29, 2025

(30) Foreign Application Priority Data

Nov. 28, 2023  (IN) .............................. 202321080778

(51) Int. Cl.
  *B60R 21/2165*  (2011.01)
  *B60R 21/215*  (2011.01)

(52) U.S. Cl.
  CPC ...... *B60R 21/2165* (2013.01); *B60R 2021/21537* (2013.01)

(58) Field of Classification Search
  CPC ............................................. B60R 2021/21537
  See application file for complete search history.

(56) References Cited

FOREIGN PATENT DOCUMENTS

| EP | 2674334 A1 | * | 12/2013 | ......... B60R 21/2155 |
| FR | 3104511 A1 | * | 6/2021 | ........... B60R 21/215 |
| JP | 2004352104 A | * | 12/2004 | |
| KR | 20110056925 A | * | 5/2011 | ........... B60R 21/045 |
| KR | 20120018501 A | * | 3/2012 | ........... B60R 21/215 |
| KR | 20250108986 A | * | 7/2025 | ........... B60R 21/205 |
| WO | WO-2007049514 A1 | * | 5/2007 | ........... B60R 21/205 |

* cited by examiner

*Primary Examiner* — Nicole T Verley
(74) *Attorney, Agent, or Firm* — Reising Ethington P.C.

(57) ABSTRACT

A safety module for a vehicle includes a housing having an opening that accommodates an airbag associated with the safety module during deployment of the airbag, and at least one cover attached over the opening of the housing. The cover is connected to the housing through one or more hinges, where each hinge is formed by one or more curved portions and one or more flat portions arranged adjacent to each other along a hinge axis. The flat portions include one or more ribs protruding from an upper surface of the flat portions, which can be welded to an inner surface of a carrier of the vehicle for preventing the separation of the cover during airbag deployment.

12 Claims, 8 Drawing Sheets

SAFETY MODULE FOR A VEHICLE

TECHNICAL FIELD

The present disclosure relates to the field of automotive airbags and safety modules.

BACKGROUND

This background description includes information that may be useful in understanding the present invention. It is not an admission that any of the information provided herein is prior art or relevant to the presently claimed invention, or that any publication specifically or implicitly referenced is prior art.

Airbags are important safety components in modern vehicles, designed to rapidly inflate and cushion passengers in the event of a collision, thereby reducing the risk of injury. Conventional airbag deployment systems include a guiding element that directs the path of the inflating airbag to protect passengers optimally.

In many existing safety systems, the guiding element has an opening or passageway through which the airbag deploys during a collision. This passageway is often covered by panels that are connected to the guiding element through hinges. The hinges are designed to enable the panels to open and allow the airbag to extend outward during deployment without separation of the panels from the guiding element.

SUMMARY

The present disclosure is directed to an airbag system or safety module that helps ensure the airbag deployment mechanism functions as intended, while also preventing the separation of cover panels during airbag deployment.

Some of the objects of the present disclosure, which at least one embodiment herein satisfies, are as listed herein below.

It is an object of the present disclosure to provide an improved safety module for a vehicle, which allows unobstructed deployment of airbags in the event of a collision while preventing the separation of the safety module's cover during airbag deployment.

An aspect of the present disclosure pertains to a safety module for a vehicle. The safety module comprises a housing having an opening, the housing adapted to accommodate an airbag associated with the safety module during deployment of the airbag, and one or more covers adapted to cover the opening of the housing. The one or more covers are connected to the housing through one or more hinges, where the one or more hinges are formed by one or more curved portions and one or more flat portions arranged adjacent to each other along a hinge axis. Further, the one or more flat portions comprise one or more ribs protruding from an upper surface of the one or more flat portions which are adapted to be welded to an inner surface of a carrier of the vehicle. This arrangement of the one or more ribs adapted to be welded to an inner surface of a carrier restricts separation of the cover from the housing upon deployment of the airbag.

In an aspect, the airbag may be configured to inflate and extend out of the housing through the opening upon deployment, while moving the one or more covers to an open position.

In an aspect, the one or more covers may comprise a pair of panels arranged in a same plane in its closed position. Each of the panels may be connected to the housing through the respective hinges further adapted to pivot from pressure exerted by the airbag during deployment to allow the panels to extend out of the opening while rotating about the hinge axis associated with the one or more hinges. In another aspect, the one or more covers may comprise a single panel arranged in a same plane as that of the housing in its closed position.

In an aspect, the pair of panels may be connected by one or more breakable members in the closed portion. The one or more breakable members may be adapted to break from the pressure exerted by the airbag. The airbag upon its deployment may allow the separated panels to pivot. The separated panels may pivot in opposite direction to each other.

In an aspect, the one or more ribs may extend along at least on a portion of a perimeter or edge of the one or more flat portions of the one or more hinges.

In an aspect, the one or more ribs extend along at least on a portion in-between a centre and a perimeter or edge of the one or more flat portions of the one or more hinges. Wherein along a length of the one or more flat portions, the one or more ribs completely overlap with the one or more flat portions. Further, along a width of the one or more flat portions, the one or more ribs overlap only about one-third portion of the one or more flat portions.

In an aspect, the one or more ribs may comprise a first welding rib extending along a first end of the one or more flat portions, where the first end of the corresponding flat portion is connected to the one or more covers. The one or more welding ribs may further comprise a second welding rib extending along a second end, opposite to the first end, of the one or more flat portions, where the second end of the corresponding flat portion is connected to the housing.

In an aspect, the one or more ribs may be located and be extending centrally along a length of the one or more flat portions of the one or more covers.

In an aspect, the one or more covers may be further connected to the housing through one or more second breakable members that are adapted to break from pressure exerted by the airbag during deployment and correspondingly allow the panels to pivot to the open position of the cover.

In an aspect, the housing may include a guiding portion adapted to guide the deployment of the airbag.

In an aspect, the housing or the safety module may be configured to be installed at predefined positions in the carrier of the vehicle. In an aspect, the carrier may be a dashboard of the vehicle. In another aspect, the carrier may be associated with a group comprising a steering wheel, door panels, rear side of seats, lateral sides of the seats, and roof panels of the vehicle.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
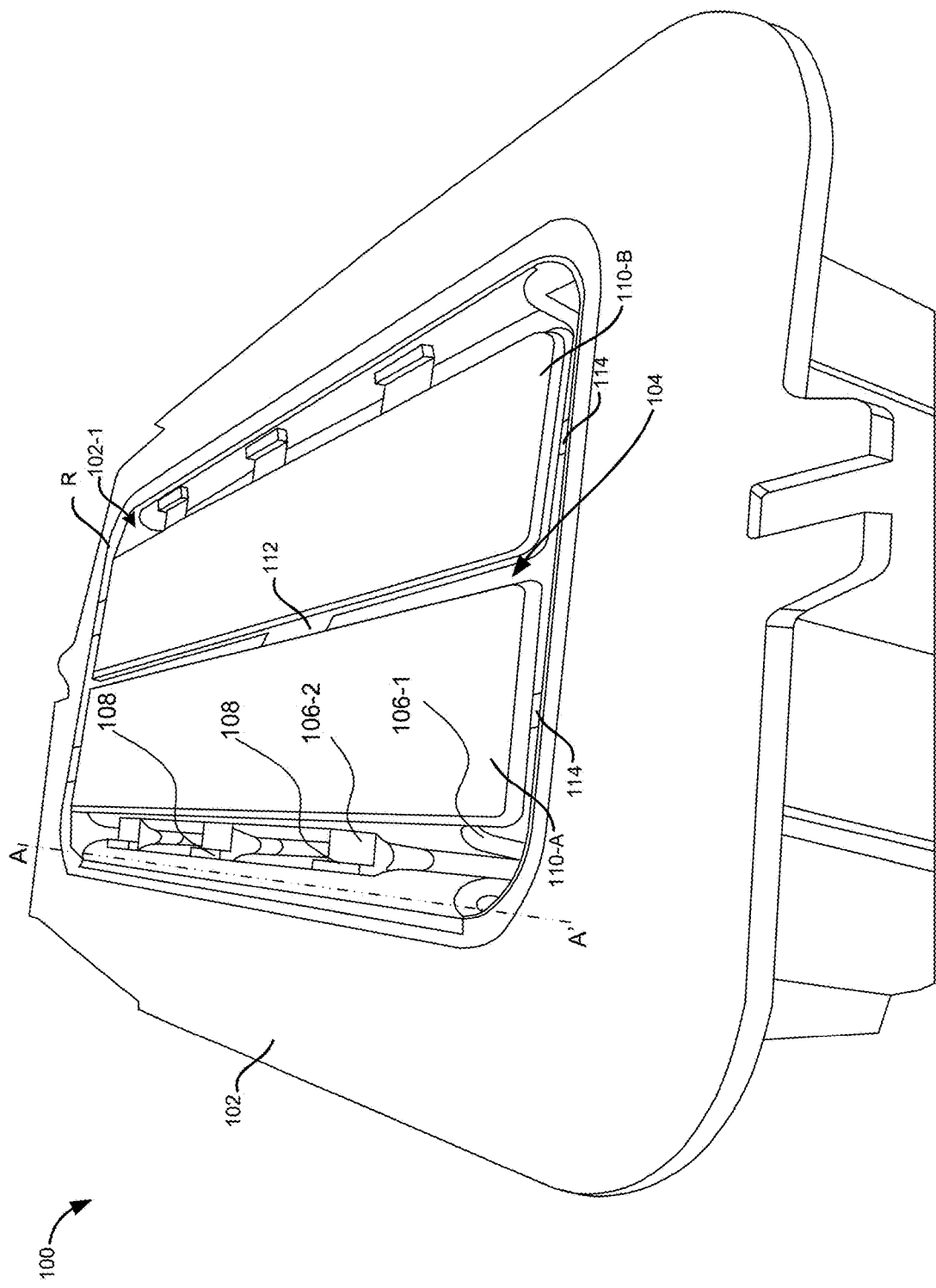
FIG. 1 illustrates an exemplary perspective view of a first embodiment of the safety module, in accordance with an embodiment of the present invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

According to an aspect, the present disclosure elaborates upon a safety module for a vehicle. The safety module comprises a housing having an opening, the housing adapted to accommodate an airbag associated with the safety module during deployment of the airbag, and one or more covers adapted to cover the opening of the housing. The one or more covers are connected to the housing through one or more hinges, where the one or more hinges are formed by one or more curved portions and one or more flat portions arranged adjacent to each other along a hinge axis. Further, the one or more flat portions comprise one or more ribs protruding from an upper surface of the one or more flat portions which are adapted to be welded to an inner surface of a carrier of the vehicle. This arrangement of the one or more ribs adapted to be welded to an inner surface of a carrier restricts separation of the cover from the housing upon deployment of the airbag.

In an embodiment, the airbag can be configured to inflate and extend out of the housing through the opening upon deployment, while moving the one or more covers to an open position.

In an embodiment, the one or more covers can include a pair of panels arranged in a same plane in its closed position. Each of the panels can be connected to the housing through the respective hinges which can be further adapted to pivot from pressure exerted by the airbag during deployment to allow the panels to extend out of the opening while rotating about the hinge axis associated with the one or more hinges. In another aspect, the one or more covers may comprise a single panel arranged in a same plane as that of the housing in its closed position.

In an embodiment, the pair of panels can be connected by one or more breakable members in the closed position. The one or more breakable members can be adapted to break from the pressure exerted by the airbag. The airbag upon its deployment can allow the separated panels to pivot. The separated panels can pivot in opposite direction to each other.

In an aspect, the one or more ribs extend along at least on a portion in-between a centre and a perimeter or edge of the one or more flat portions of the one or more hinges. Wherein along a length of the one or more flat portions, the one or more ribs completely overlaps with the one or more flat portions. Further, along a width of the one or more flat portions, the one or more ribs overlap only about one-third portion of the one or more flat portions.

In an embodiment, the one or more ribs can extend along at least on a portion of a perimeter or edge of the one or more flat portions of the one or more hinges.

In an embodiment, the one or more ribs can include a first welding rib extending along a first end of the one or more flat portions, where the first end of the corresponding flat portion is connected to the one or more covers. The one or more welding ribs can further include a second welding rib extending along a second end, opposite to the first end, of the one or more flat portions, where the second end of the corresponding flat portion is connected to the housing.

In an embodiment, the one or more ribs can be located and extended centrally along a length of the one or more flat portions of the one or more covers.

In an embodiment, the one or more ribs can be configured on an upper surface of the one or more flat portions.

In an embodiment, the one or more covers can be further connected to the housing through one or more second breakable members that are adapted to break from pressure exerted by the airbag during deployment and correspondingly allow the panels to pivot to the open position of the cover.

In an embodiment, the housing can include a guiding portion. The guiding portion can be adapted to guide the deployment of the airbag.

In an embodiment, the housing or the safety module can be configured to be installed at predefined positions in the carrier of the vehicle. In an aspect, the carrier may be a dashboard of the vehicle. In another aspect, the carrier can be associated with a group including a steering wheel, door panels, rear side of seats, lateral sides of the seats, and roof panels of the vehicle.

Referring to FIGS. 1 to 3B, in an embodiment, the proposed safety module 100 is disclosed. The safety module 100 can include a hollow housing 102 having an opening 102-1. The housing 102 can be adapted to accommodate an airbag 300 associated with an airbag system, out of the housing 102 via the opening 102-1, during deployment of the airbag 300. The safety module 100 can further include one or more covers 104 (collectively referred to as cover or door 104, herein) attached to the housing 102 to close the opening 102-1 and secure the airbag 300 within the housing 102 in an undeployed condition as shown in FIG. 3A.

Figure 2A:
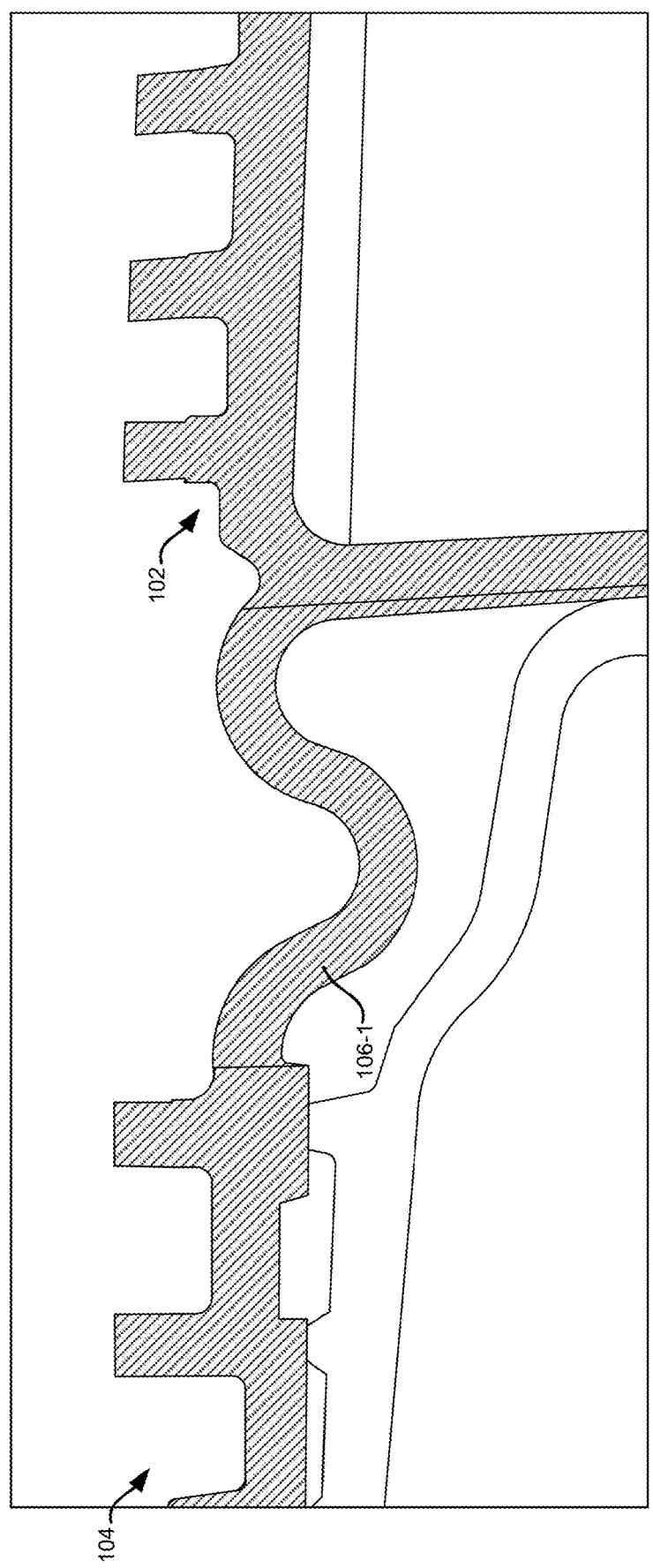
FIG. 2A illustrates an exemplary side cross-sectional view of the hinge area of the safety module having curved portions, in accordance with an embodiment of the present invention.
Figure 2B:
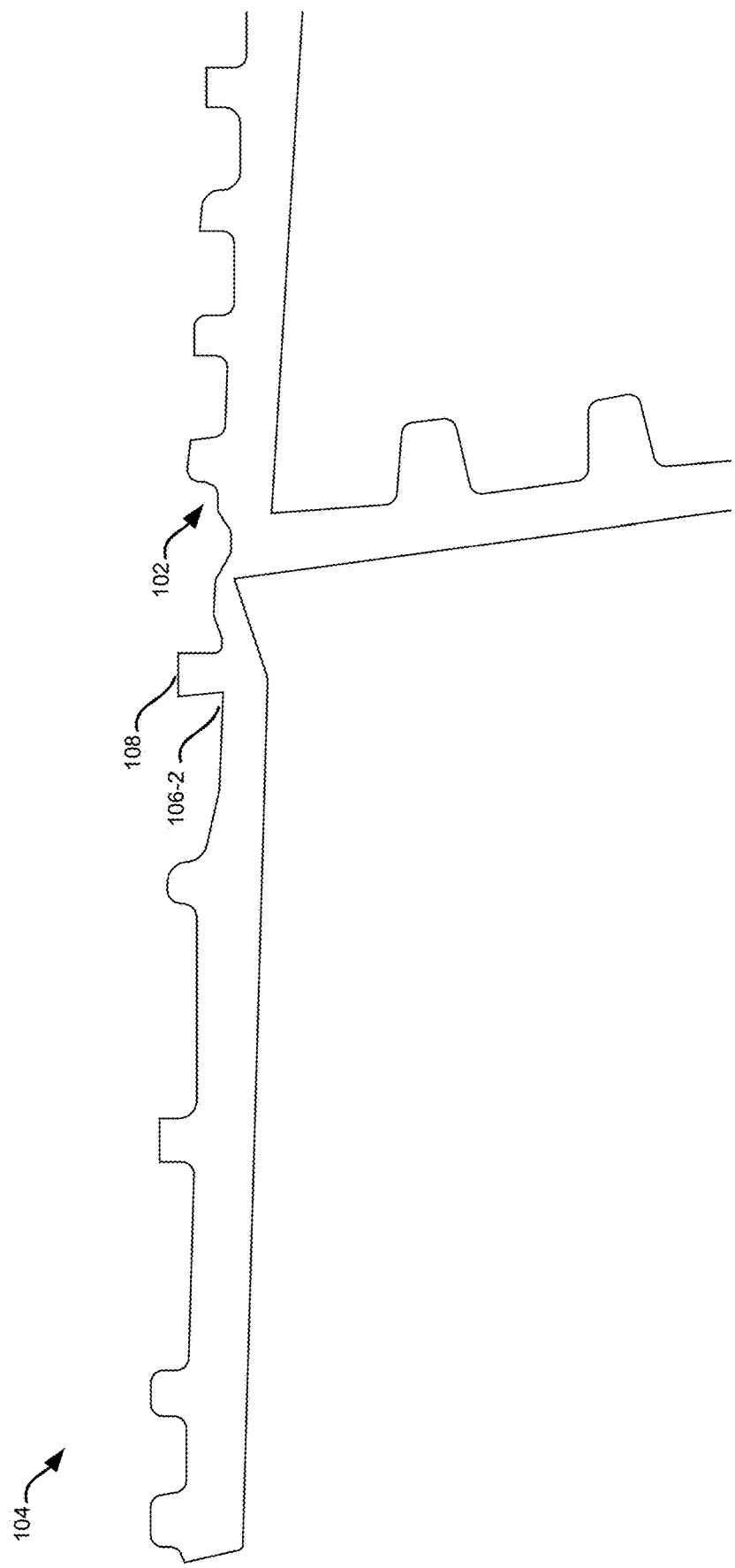
FIG. 2B illustrates an exemplary side cross-sectional view of the hinge area of the safety module having flat portions, in accordance with an embodiment of the present invention.
Figure 2C:
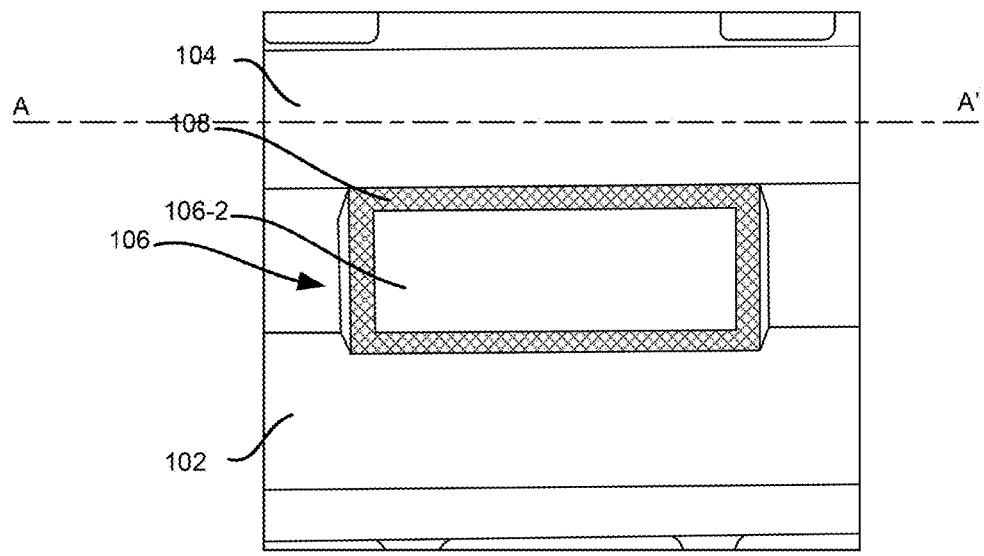
FIG. 2C to 2G illustrate exemplary top views of the hinge area of the safety module having the ribs in different configurations, in accordance with an embodiment of the present invention.
Figure 2D:
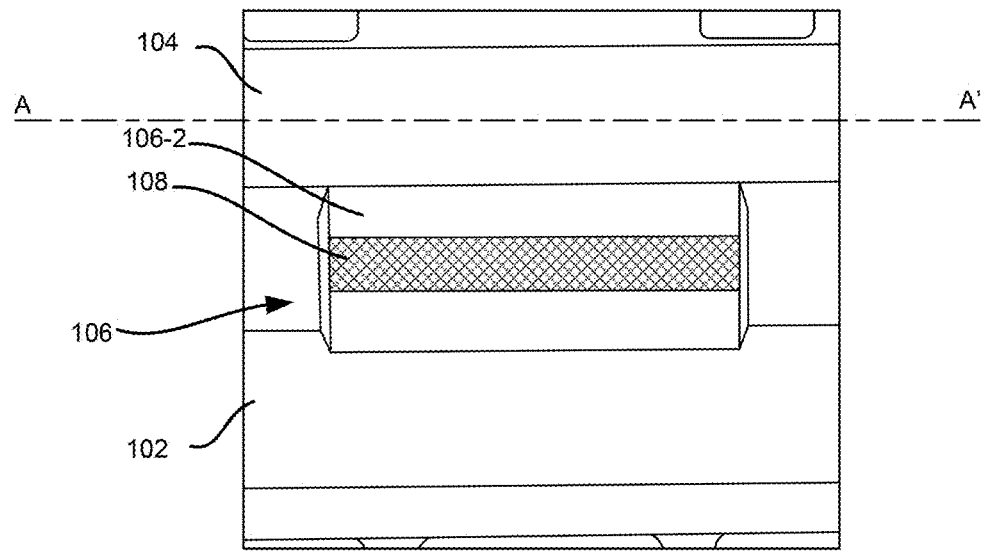
Figure 2E:
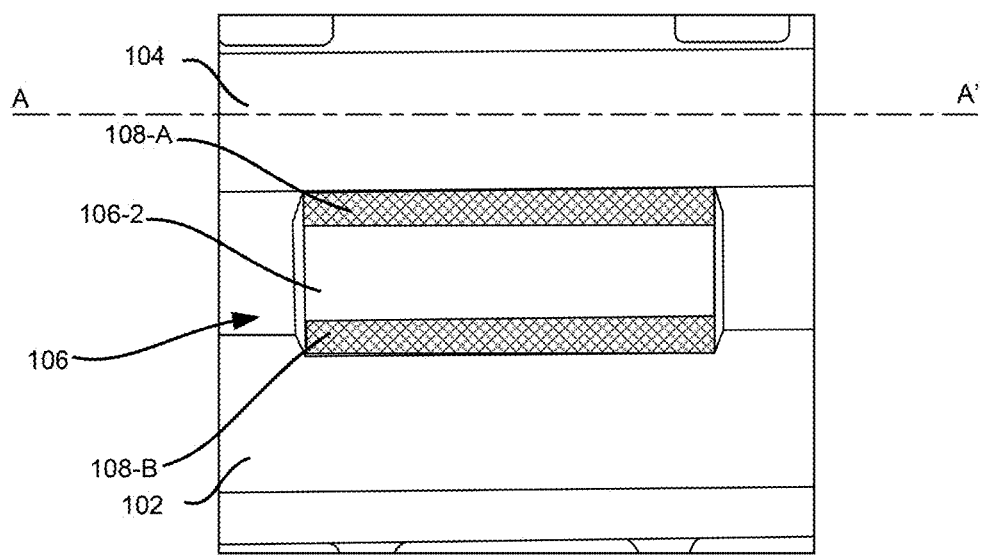
Figure 2F:
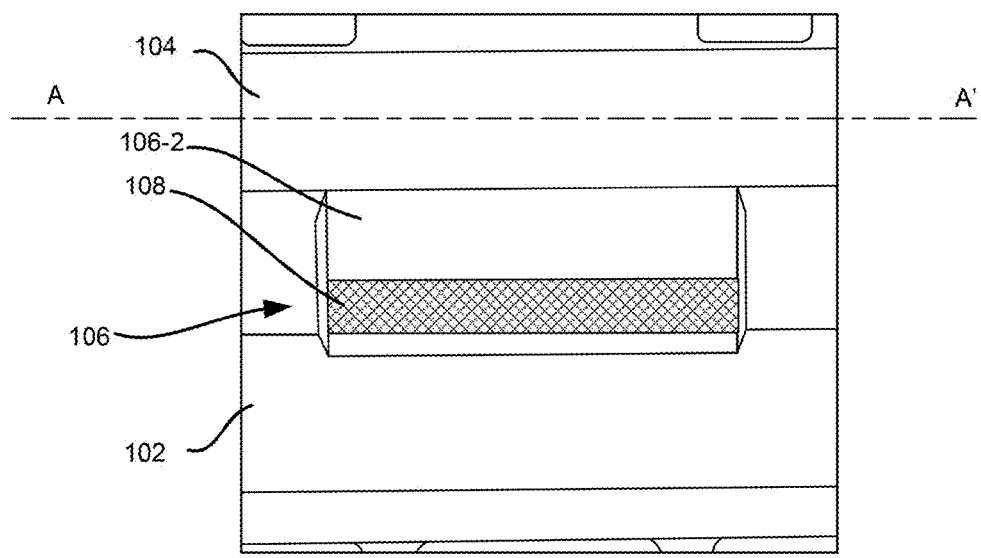
Figure 3A:
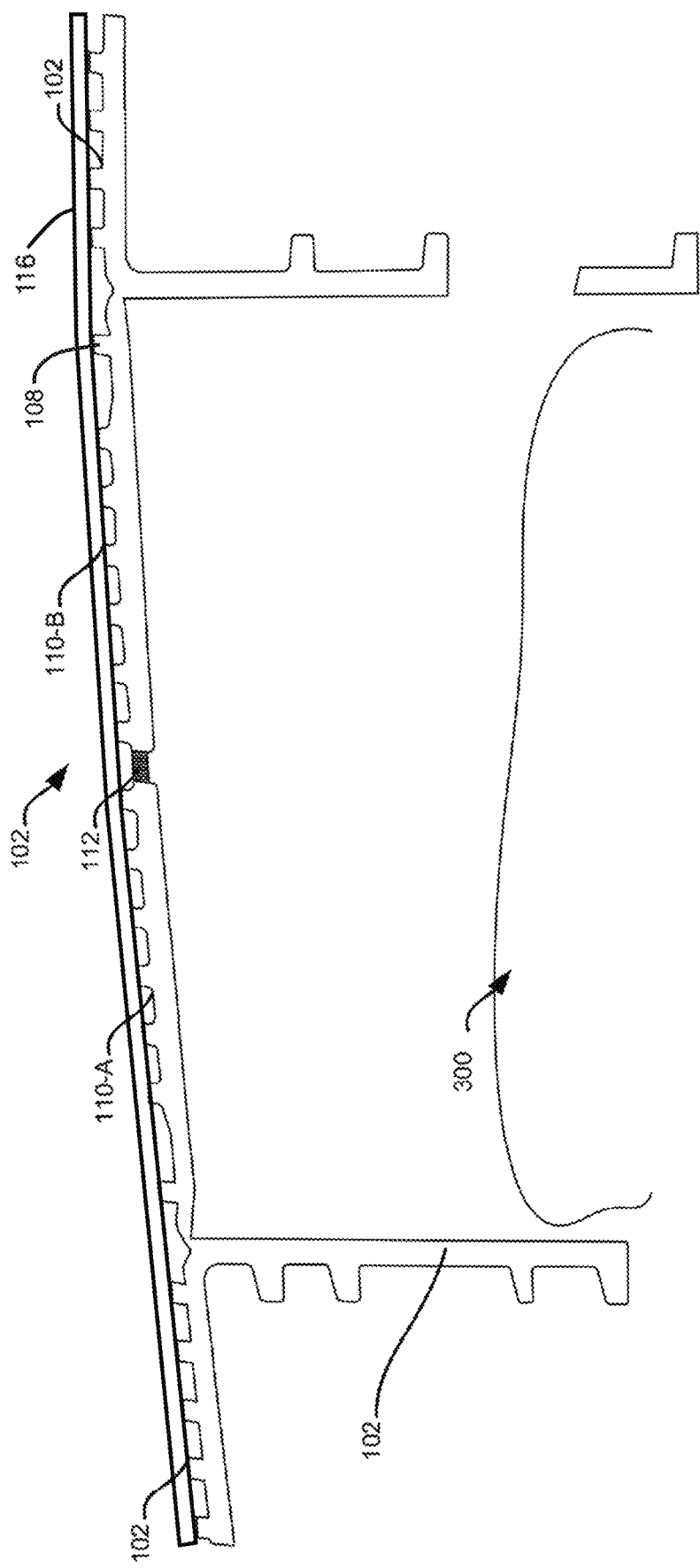
FIG. 3A illustrates an exemplary side cross-sectional view of the safety module in a normal (undeployed) condition where the cover is in a closed condition, in accordance with an embodiment of the present invention.
Figure 3B:
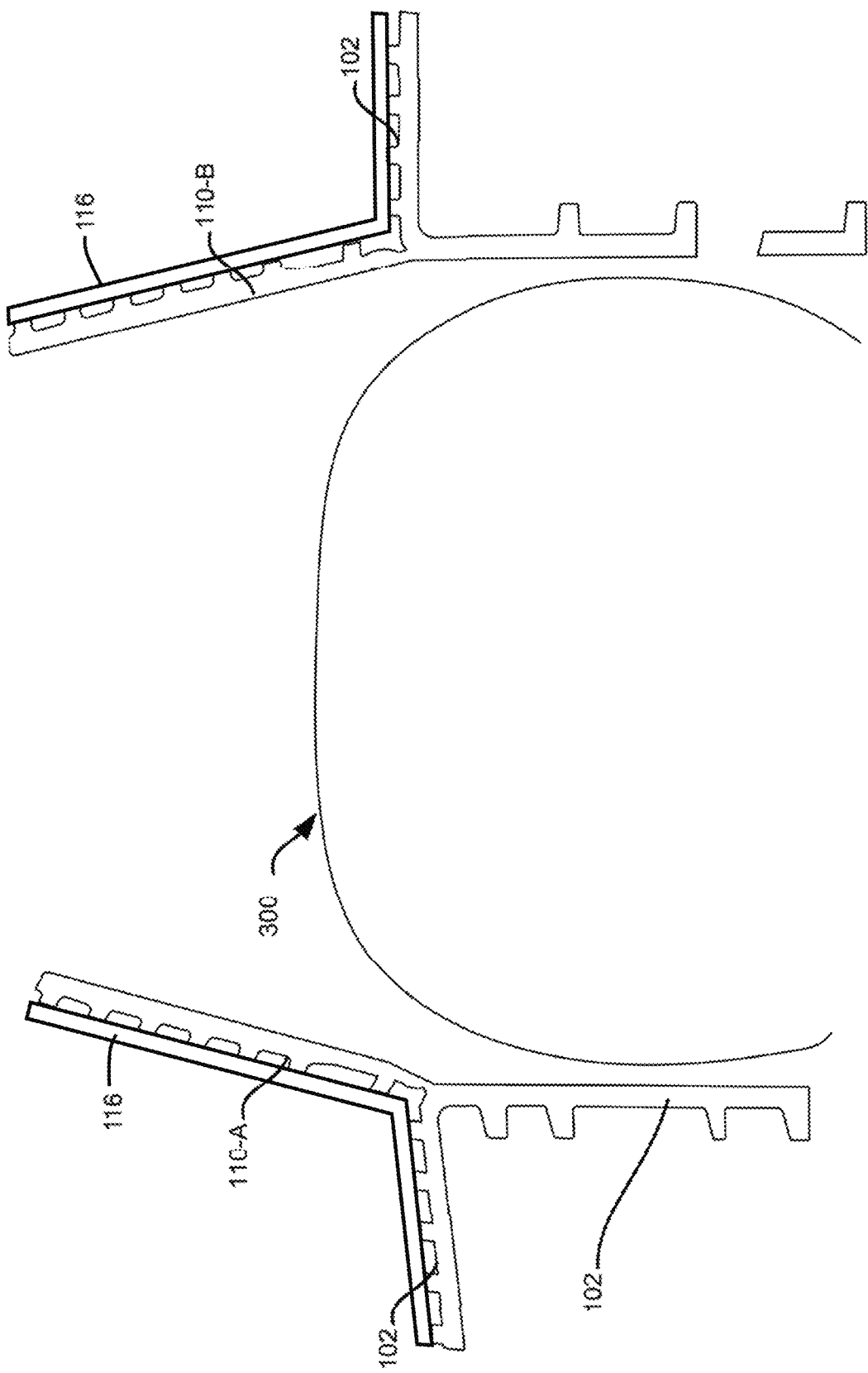
FIG. 3B illustrates an exemplary side cross-sectional view of the safety module in a deployed condition where the cover is in an open condition, in accordance with an embodiment of the present invention.

In an embodiment, the cover 104 can be connected to the housing 102 (at the rim area R of the opening 102-1 as shown in FIGS. 3A and 3B) using one or more hinges 106-A to 106-N (collectively designated as the hinge 106, herein). Further, the one or more hinges 106 can include curved portion(s) 106-1 and flat portions 106-2 (collectively designated as flat portions 106-2, herein) arranged adjacent to each other along a hinge axis (as shown in FIG. 1). As illustrated in FIG. 2C to 2F, a first end of the curved portion 106-1 and the flat portions 106-2 can be connected to the cover 104 and a second end of the curved portion 106-1 and the flat portions 106-2 can be connected to the housing 102.

The flat portions can further include one or more ribs 108 (collectively referred to as rib or rib 108, herein) configured on an upper surface of the flat portions 106-2 of the hinge 106. The one or more ribs 108 are adapted to be welded on an inner portion of a carrier 116 of the vehicle which restricts separation of the cover 104 from the housing 102 upon opening of the cover 104 when the airbag 300 is deployed. Accordingly, when the airbag 300 is inflated in the event of collision of the vehicle, the inflating airbag 300 moving out of the housing 102 through the opening 102-1 may be guided by a guiding portion (not shown), while pivoting the cover 104 (panels 110-A, 110-B) outwards to an open position as shown in FIG. 3B. However, the rib 108 provides additional strength to the hinge 106 such that it can restrict separation of the corresponding cover 104 (panels 110-A, 110-B) from the housing 102 upon movement of the cover 104 to the open position, without obstructing the deployment of the airbag 300 as shown in FIG. 3B.

In an embodiment, the cover 104 can include a pair of panels 110-A, 110-B that can be connected to each other by at least one first breakable member 112. In addition, the cover 104 or panels 110-A, 110-B of the cover 104 can be further connected to the housing 102 through one or more second breakable members 114 such that the panels 110-A, 110-B remain connected to the housing 102 through the hinges 106 and the second breakable members 114, while the panels 110-A, 110-B remain connected together by the first breakable member 112.

The first breakable member 112 and the second breakable members 114 can be made of fracturable material that can keep the panels connected to each other and the housing 102 to keep the opening closed in normal condition while breaking under pressure exerted by the airbag 300 during deployment, thereby separating the panels 110-A, 110-B from each other and correspondingly allowing the separated panels 110-A, 110-B to rotate out of the opening about a hinge axis A-A' associated with the hinge 106. In an exemplary embodiment, the first breakable member 112 and the second breakable members 114 can be made of thin-walled aluminum or plastic, and/or perforated metal, alloys, or plastic, but is not limited to the like, which can break under pressure on the panels 110-A, 110-B or cover 104.

In an embodiment, as illustrated in FIG. 2C, the rib 108 can extend along the perimeter or edges of the corresponding hinge 106 or flat portion 106-2. Further, in another embodiment, as shown in FIG. 2D, the rib 108 can extend along a length of the flat portion 106-2 or hinge 106, such that the rib 108 remains in between and parallel to opposite ends (first end and second end) of the corresponding flat portions 106-2. Furthermore, in yet another embodiment, as shown in FIG. 2E, a first welding rib 108-A can extend along the first end of the flat portions 106-2, and a second welding rib 108-B can extend along a second end, opposite to the first end, of the flat portions 106-2.

Figure 2G:
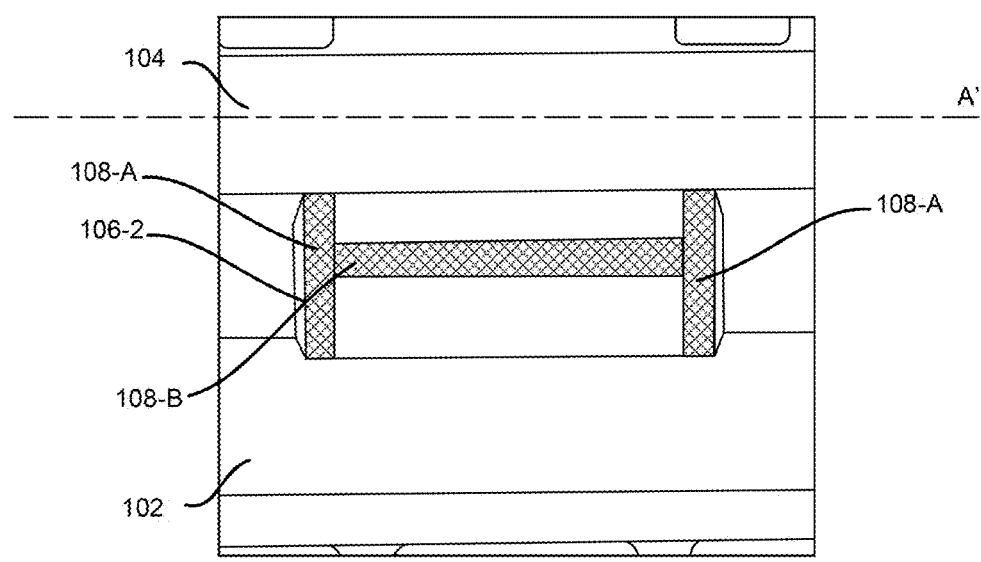

Further, in a preferred embodiment, as shown in FIG. 2F, the one or more ribs 108 can extend along at least on a portion in-between a centre and a perimeter or edge of the one or more flat portions 106-2 of the one or more hinges 106. More particularly, along a length of the one or more flat portions 106-2, the one or more ribs 108 can completely overlap with the one or more flat portions 106-2, wherein along a width of the one or more flat portions (106-2), the one or more ribs 108 can overlap only about one-third portion of the one or more flat portions 106-2. Furthermore, in yet another embodiment, as shown in FIG. 2G, a pair of first welding ribs 108-A can extend along opposite edges that extend between the first end and the second end of the flat portions 106-2 in a direction perpendicular to the hinge axis A-A', and a second welding rib 108-B can extend along a length of the flat portion 106-2 or hinge 106, such that the rib 108 remains in between and parallel to opposite ends (first end and second end) of the corresponding flat portions 106-2. Accordingly, these additional ribs 108 on the flat portions 106-2 of the hinges 106 can restrict the creation of multiple hinge axes and direct all the load to the primary hinge axis A-A', which allows clear rotation of the cover panels 110, without uncontrollable separation from the housing 102.

Referring to FIG. 3A, when the airbag 300 is un-inflated in normal conditions, the housing 102 can accommodate the airbag 300 therewithin and the cover 104 can secure the airbag 300. As there is no pressure or force from the airbag 300, the first breakable members 112 and the second breakable member 114 can remain unfractured to keep the panels 110-A, 110-B connected. In addition, the hinges 106 can keep the cover 104 or panels 110-A, 110-B connected to the housing 102 to keep the opening 102-1 covered.

Referring to FIG. 3B, when the airbag 300 is inflated in the event of collision of the vehicle, the housing 102 can guide the inflating airbag 300 to move out of the housing 102 through the opening 102-1, while extending or rotating the cover 104 outwards to an open position. The pressure or force from the inflating airbag 300 can cause the first breakable members 112 and the second breakable member 114 to fracture or break, thereby separating the panels 110-A, 110-B from each other to expose the opening of the housing 102. However, the rib 108 can keep the panels 110-A, 110-B connected to the housing 102 and restrict separation of the corresponding cover 104 from the housing 102 upon movement of the cover 104 to the open position, without obstructing the deployment of the airbag 300.

Those skilled in the art would appreciate that, while various embodiments and drawings of the present disclosure have been elaborated for the safety module 100 having a single cover 104 and a pair of panels 110-A, 110-B forming the respective cover 104 for the sake of simplicity and better explanation, the teachings of the present disclosure are equally applicable for the safety module 100 having any number of covers or panels without any limitations, and all such embodiments are well within the scope of the present disclosure.

In an embodiment, the housing 102 or the safety module 100 can be configured to be installed at predefined positions in the carrier of the vehicle such that only the door remains seamlessly visible from the interior of the vehicle. In an embodiment, the carrier for the airbag system or the safety module 100 can be at any or a combination of a steering wheel, a dashboard, door panels, rear side of seats, lateral sides of the seats, roof panels of the vehicle, but not limited to the like.

Thus, the present invention provides an improved safety module that ensures the airbag deployment mechanism functions as intended, while also preventing the separation of the cover during airbag deployment.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

I claim:

1. A safety module for a vehicle, the safety module comprising:
   a housing having an opening, the housing adapted to accommodate an airbag associated with the safety module during deployment of the airbag; and
   one or more covers adapted to cover the opening of the housing, the one or more covers being connected to the housing through one or more hinges, wherein the one or more hinges are formed by one or more curved portions and one or more flat portions arranged adjacent to each other along a hinge axis, and
   wherein the one or more flat portions comprise one or more ribs protruding from an upper surface of the one or more flat portions and adapted to be welded to an inner surface of a carrier of the vehicle.

2. The safety module as claimed in claim 1, wherein the airbag is configured to inflate and extend out of the housing through the opening upon deployment while moving the one or more covers to an open position.

3. The safety module as claimed in claim 1, wherein the one or more covers comprise a pair of panels arranged in a same plane in its closed position, wherein each of the panels is connected to the housing through the respective hinges located along respective hinge axes, the one or more hinges of each panel further being adapted to pivot from pressure exerted by the airbag during deployment to allow the panels to extend out of the opening while rotating about their respective hinge axis.

4. The safety module as claimed in claim 3, wherein the pair of panels are connected by one or more first breakable members in the closed position adapted to break from the pressure exerted by the airbag upon its deployment to thereby allow the separated panels to pivot in an opposite direction to each other.

5. The safety module as claimed in claim 1, wherein the one or more ribs extend along at least on a portion of a perimeter or edge of the one or more flat portions of the one or more hinges.

6. The safety module as claimed in claim 1, wherein the one or more ribs extend along at least on a portion in-between a centre and an edge of the one or more flat portions of the one or more hinges.

7. The safety module as claimed in claim 6, wherein along a length of the one or more flat portions, the one or more ribs completely overlap with the one or more flat portions, wherein along a width of the one or more flat portions, the one or more ribs overlap only about one-third portion of the one or more flat portions.

8. The safety module as claimed in claim 1, wherein the one or more ribs comprise:
   a first welding rib extending along a first end of the one or more flat portions, wherein the first end of the corresponding flat portion is connected to the one or more covers; and/or
   a second welding rib extending along a second end, opposite to the first end, of the one or more flat portions, wherein the second end of the corresponding flat portion is connected to the housing.

9. The safety module as claimed in claim 1, wherein the one or more ribs are located and extend centrally along a length of the one or more flat portions of the one or more covers.

10. The safety module as claimed in claim 3, wherein the panels are further connected to the housing through one or more second breakable members that are adapted to break from pressure exerted by the airbag during deployment and correspondingly allow the panels to pivot to the open position.

11. The safety module as claimed in claim 1, wherein the housing includes a guiding portion adapted to guide the deployment of the airbag.

12. The safety module as claimed in claim 1, wherein the housing or the safety module is configured to be installed at one or more predefined positions in the carrier of the vehicle, wherein the carrier is associated with a group comprising a steering wheel, a dashboard, door panels, rear side of seats, lateral sides of the seats, and roof panels of the vehicle.

* * * * *